March 15, 1938.  A. E. TESSIER  2,111,340
COIN CONTROLLED ADVERTISEMENT EXHIBITOR
Original Filed Nov. 12, 1935   5 Sheets-Sheet 1

INVENTOR
Albert E. Tessier
BY
Samuel H. Davis
ATTORNEY

March 15, 1938.  A. E. TESSIER  2,111,340
COIN CONTROLLED ADVERTISEMENT EXHIBITOR
Original Filed Nov. 12, 1935   5 Sheets-Sheet 2

INVENTOR
Albert E. Tessier
BY
Samuel H. Davis
ATTORNEY

March 15, 1938.　　　　　A. E. TESSIER　　　　　2,111,340
COIN CONTROLLED ADVERTISEMENT EXHIBITOR
Original Filed Nov. 12, 1935　　　5 Sheets-Sheet 3
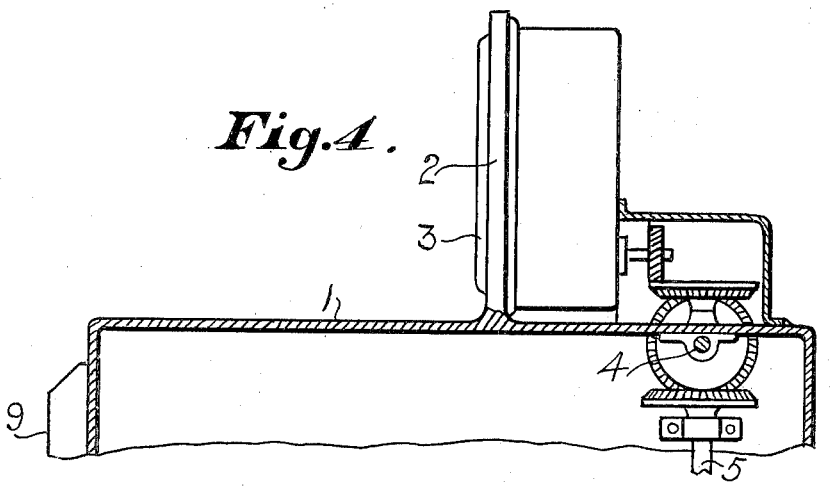
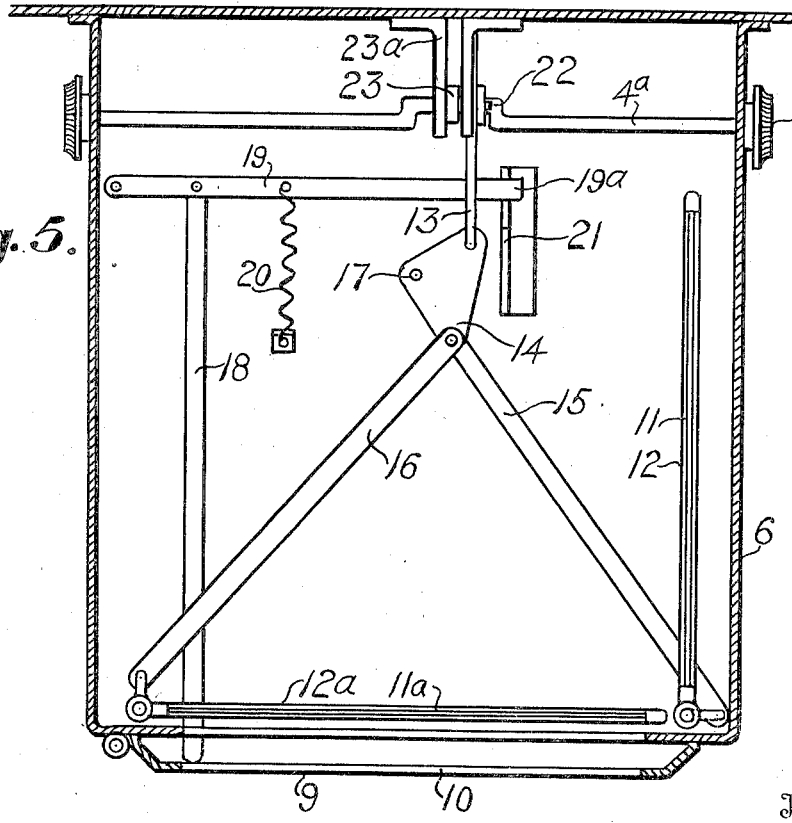
Inventor
Albert E. Tessier,
Samuel H. Davis,
By
Attorney March 15, 1938. A. E. TESSIER 2,111,340
COIN CONTROLLED ADVERTISEMENT EXHIBITOR
Original Filed Nov. 12, 1935   5 Sheets-Sheet 4
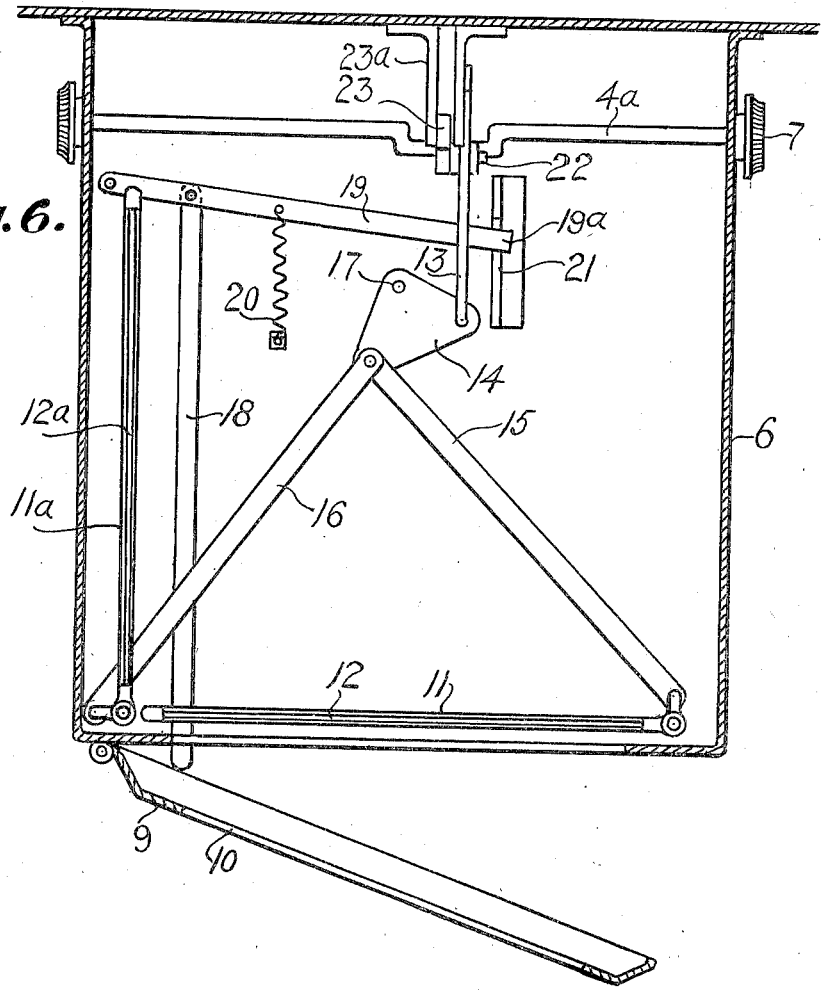
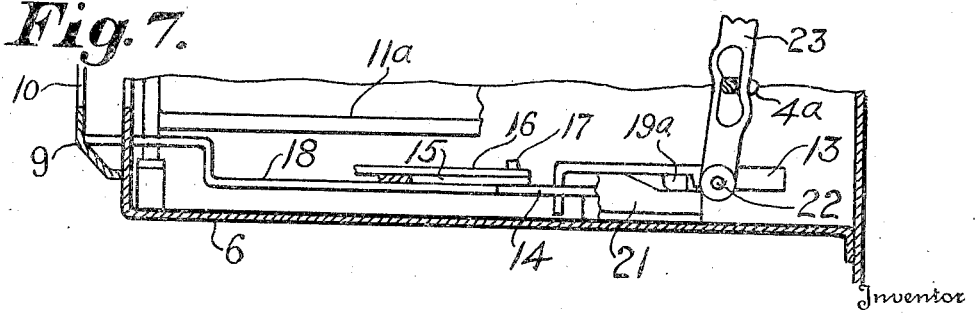
Inventor
Albert E. Tessier
By Samuel H. Davis,
Attorney Patented Mar. 15, 1938

2,111,340

UNITED STATES PATENT OFFICE 2,111,340

COIN-CONTROLLED ADVERTISEMENT EXHIBITOR

Albert E. Tessier, Detroit, Mich.

Application November 12, 1935, Serial No. 49,372
Renewed February 8, 1938

4 Claims. (Cl. 40—67)

This invention relates to advertisement exhibitors, more particularly to coin controlled apparatus whereby the exhibition of an advertisement is permitted by the deposit of a coin, and the duration of the exposure of the advertisement is governed by clockwork. The object of this invention is to provide suitable and operative mechanism for the stated purpose, and such mechanism together with certain combinations of the parts thereof is illustrated in the accompanying drawings. It is not intended, however, to confine the scope of the invention to the special forms, sizes or dispositions of the various elements, as those features are susceptible of modification by any skilful mechanic familiar with the subject-matter herein disclosed.

Fig. 1 of the drawings represents a front view of the casing showing the arrangement of the series of compartments.

Fig. 4 is a vertical sectional view of the casing showing the clockwork operated parts for driving the horizontal and vertical shafts.

Fig. 5 is a horizontal section of a compartment showing the second positions of the parts represented in Fig. 4.

Fig. 6 is a horizontal section of the compartment walls showing the positions of the parts as the door is opened.

Fig. 7 is a vertical section of the lower portion of the compartment shown in Fig. 4 and illustrating the positions of the frames and door operating members with respect to the bottom of the compartment.

Throughout the description and drawings the same number is used to refer to the same part.

Figure 1:
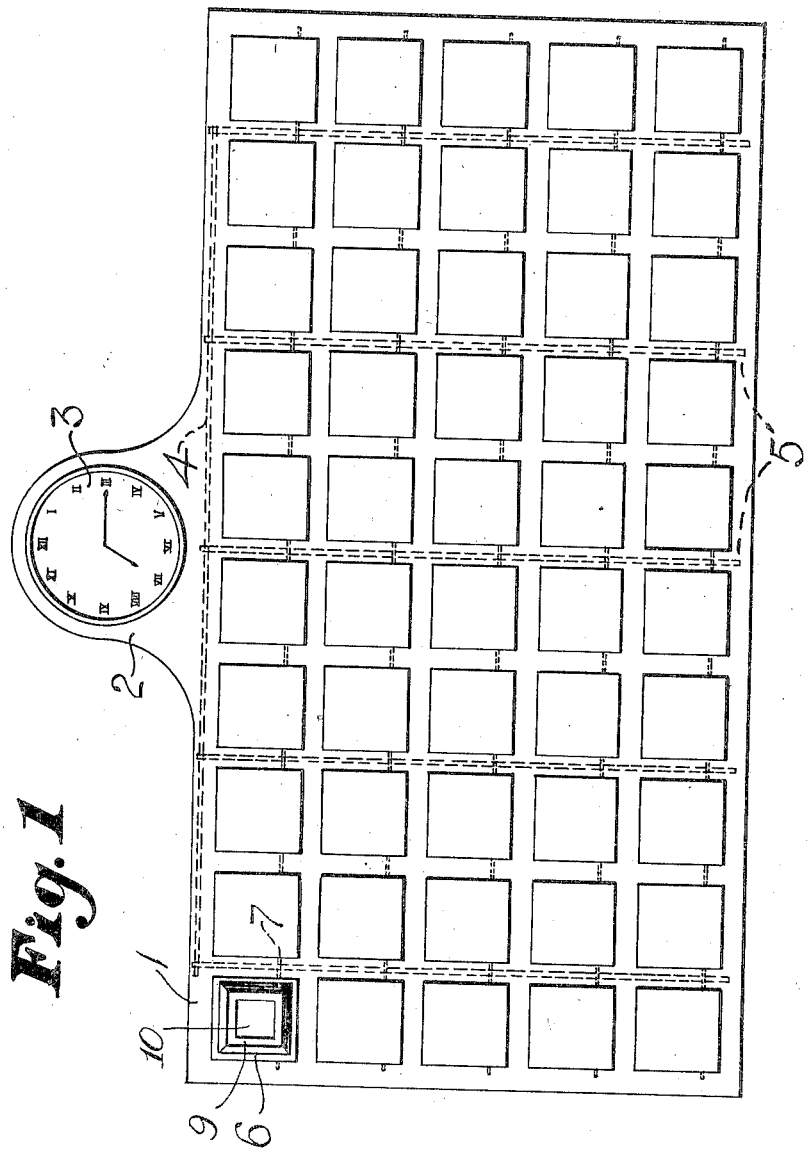
Figure 3:
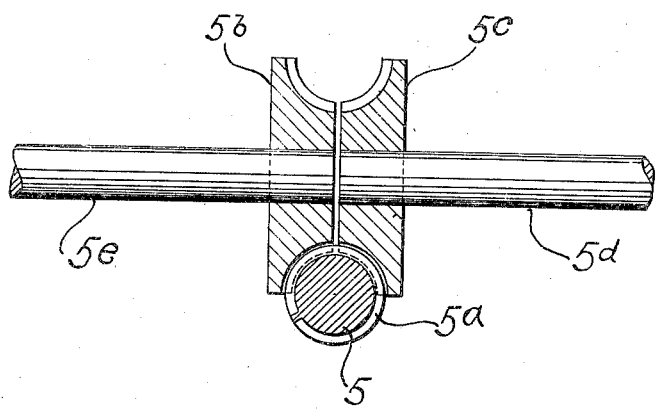
Fig. 3 is a detail view somewhat enlarged and partly sectional showing certain members of the gearing employed.
Figure 8:
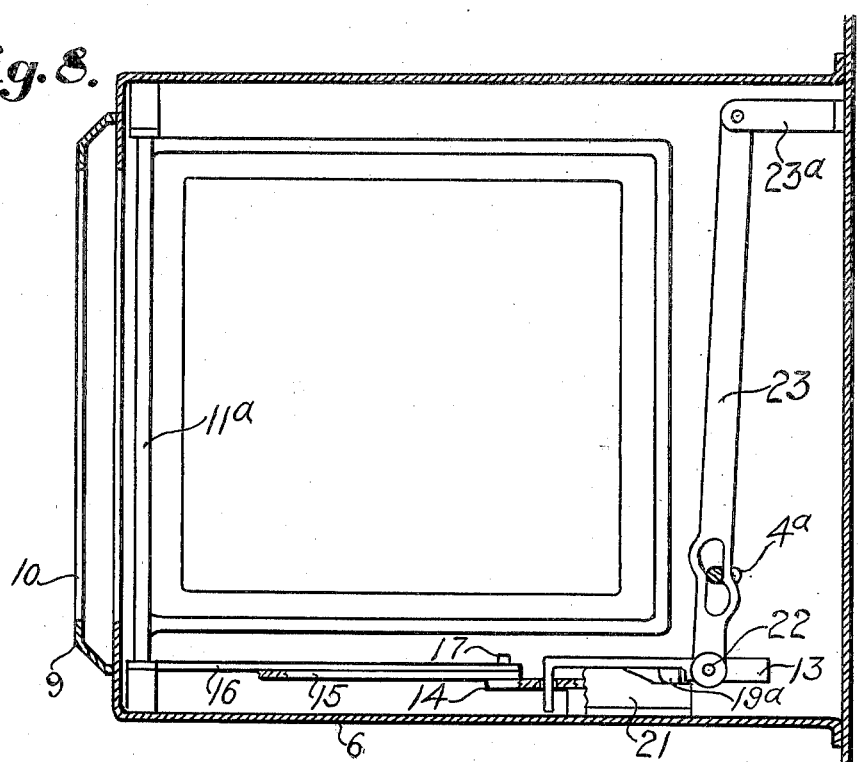
Fig. 8 is a vertical sectional view of the walls of the compartment showing the shifting hook rod in its lower position on the angle member.
Figure 9:
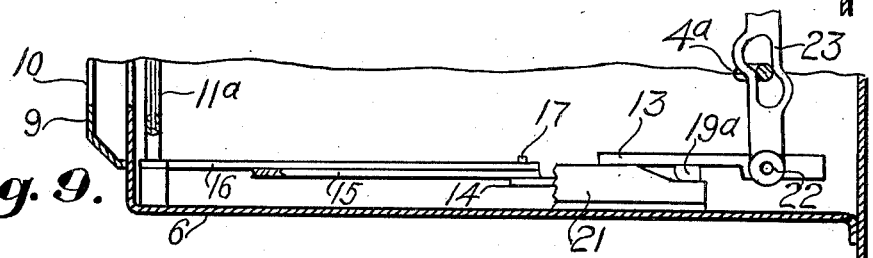
Fig. 9 is a part sectional view as in Fig. 8, showing the shifting hook rod in its second position.
Figure 10:
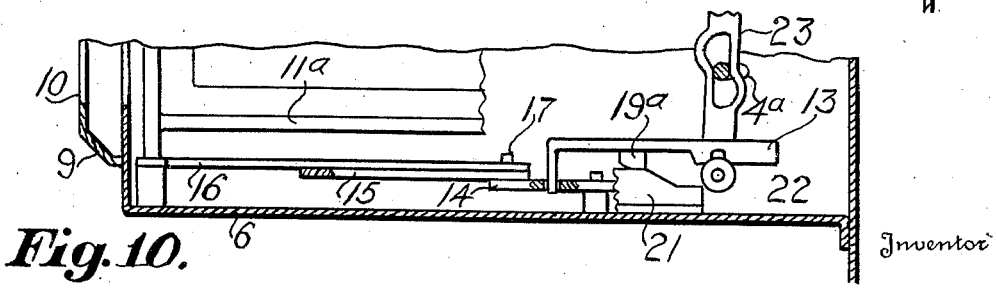
Fig. 10 is a part sectional view as in Fig. 8 showing the shifting hook rod in its raised and released position.

Considering the drawings, in Fig. 1 is shown the casing 1, having erected upon the top thereof the clock case 2 in which is contained the clock 3. The clock drives a horizontal shaft 4, and that shaft in turn revolves a plurality of vertical shafts 5. In Fig. 3, the shaft 5 has the worm 5a which engages the twin worm wheels 5b and 5c which respectively drive the individual shafts 5e and 5d.

Figure 2:
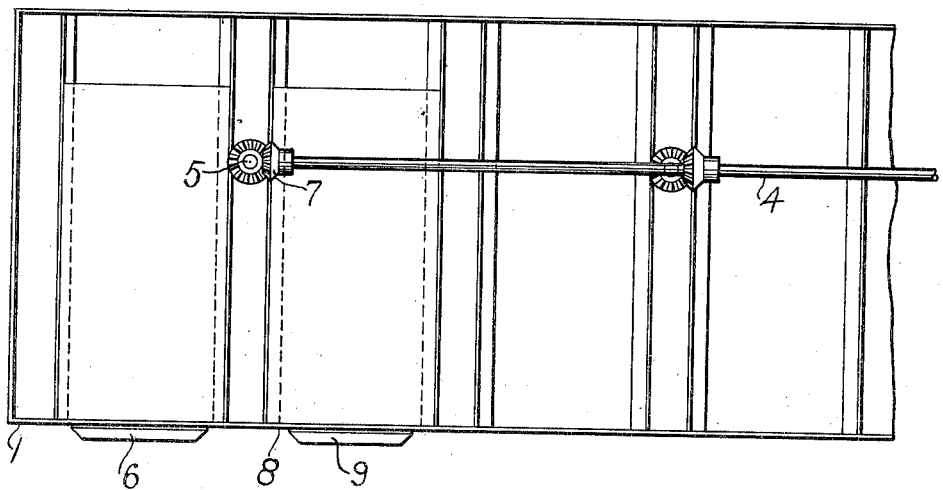
Fig. 2 is a top view of some of the units or compartments.

In the casing or housing 1 are removably secured a number or series of intermittently movable advertising machines 6 as shown in Figs. 4 and 5. The intermittent movement is driven by a gear 7 which engages with suitable gearing on one of the vertical shafts 5, as set out in Figs. 1, 2, and 3. It is the intention that the intermittent unit as shown may be leased or rented for a period of time, and that the lessee or renter may change the wording or nature of his advertisement from time to time as he may desire.

The casing with its series of units or compartments is intended to be located in some situation frequented by the public, or in some conspicuous place where it may be seen by anyone passing.

In Fig. 1, the housing 6 is provided with a hinged closure or door 9, which is constructed with an opening 10 through which the interior of the housing may be seen. The advertisement to be exhibited is placed in the slots 11—11a of the hinged or pivotal frames 12—12a, and as the gear 7 rotates it applies an agitating movement to the rod 13. Rod 13 has a pivotal connection as shown with the plate 14 which is arranged to oscillate upon the pivot 17. When this agitating movement is applied to those members, an alternating showing of the advertisement takes place by the alternating movement of the frames 12 and 12a, thereby bringing the frames alternatively before and removing them away from the opening 10 of the closure 9. If the advertiser wishes to change his advertisement, he opens the door 9, which releases the rod 18 allowing the rod to come forward. Then as the rod 18 moves with the opening of the door closure 9 the bar 19 follows that movement being pulled by the spring 20. The bar 19 has the pivot 19b and as the movement described takes place the part 19a rides upon the inclined surface of the angle plate 21, as shown in Fig. 5, thus raising the rod 13 out of its engagement with the pin 22 of the member 23. This disengagement will permit the free movement of the pivotal frames 12 and 12a. The pin 22 and the bar 23 will continue in their movement, but the frames 12—12a will not be again actuated until such time as the door 9 has been closed. When the door 9 has been closed the bar 18 is pushed inwardly and the end 19b of the bar 19 is moved into normal actuating position in relation to the angle member 21. The rod 13 is dropped down on the pin 22, and as the mechanism moves, the notch 13a of the rod 13 engages the pin 22, and the actuating movement of the frames 12—12a will again take place.

It will be noted that there may be a number of shafts having the gears 7 and driven by shafts 5. The shafts thus rotated by gears 7 are crank shafts as shown, and the crank engages a slot near the end of bar 23. As the free end of bar 23 is moved back and forth the pin 22 carried by the bar engages and shifts the rod 13 correspondingly. The applicant has shown one form of slot in bar 23, engaged by the crank shaft, but may modify the form of the slot so as to create any intermittent movement of the rod 13 which may be desired.

In operation, it will now be understood that this invention provides means for exhibiting any number of advertisements, and attracting attention to them by agitating them. It also permits the advertiser to make changes, and to renew his advertisement at will. The invention further affords the means by which the door or closure of the compartment may be unlocked or released by the introduction of a proper coin or check, and the apparatus is constructed and arranged to direct and deposit the coin in the security of the housing of the compartment, after the effect of the passing of the coin has been attained. At the same time, a screen is operated by the clockwork which will expose or hide the advertisement during the operation of the clockwork.

Having now described this invention and the manner of its use, I claim:—

1. In an advertisement exhibitor, a casing, a series of compartments in the casing, each compartment provided with a front closure, said closure having an opening through which the interior of the compartment may be inspected, a pivotally supported frame in the compartment adapted to carry an advertisement, a clockwork mechanism, and devices actuated by the clockwork for arranging the frame alternately before and away from the opening in the closure.

2. In an advertisement exhibitor, a casing, a series of compartments in the casing, each compartment provided with a front closure, said closure having an opening through which the interior of the compartment may be seen, a plurality of pivotally supported frames in the compartment, a clockwork mechanism, and devices actuated by the clockwork adapted to arrange the said frames separately and alternately before and away from the opening in the closure.

3. In an advertisement exhibitor, a casing, a series of compartments in the casing, each compartment provided with a front closure, said closure having an opening through which the interior of the compartment may be seen, a pivotally supported frame in the compartment, a clockwork mechanism, devices actuated by the clockwork and constructed for arranging the frame alternately before and away from the opening in the closure, and movable connections operated by opening and closing the closure and constructed to disengage said frame arranging devices when the said closure opens and re-engages said devices upon shutting said closure.

4. In an advertisement exhibitor, a casing, a series of compartments in the casing, each compartment provided with a front closure, said closure having an opening through which the interior of the compartment may be seen, a plurality of pivotally supported frames in the compartment, a clockwork mechanism, and devices actuated by the clockwork and constructed to arrange said frames separately and alternately before and away from the opening in the closure, and movable connections constructed to alternately connect and disconnect said clockwork and frame arranging devices.

ALBERT E. TESSIER.